W. CHICKEN.
Bark-Reducing Machine.
No. 210,095.  Patented Nov. 19, 1878.
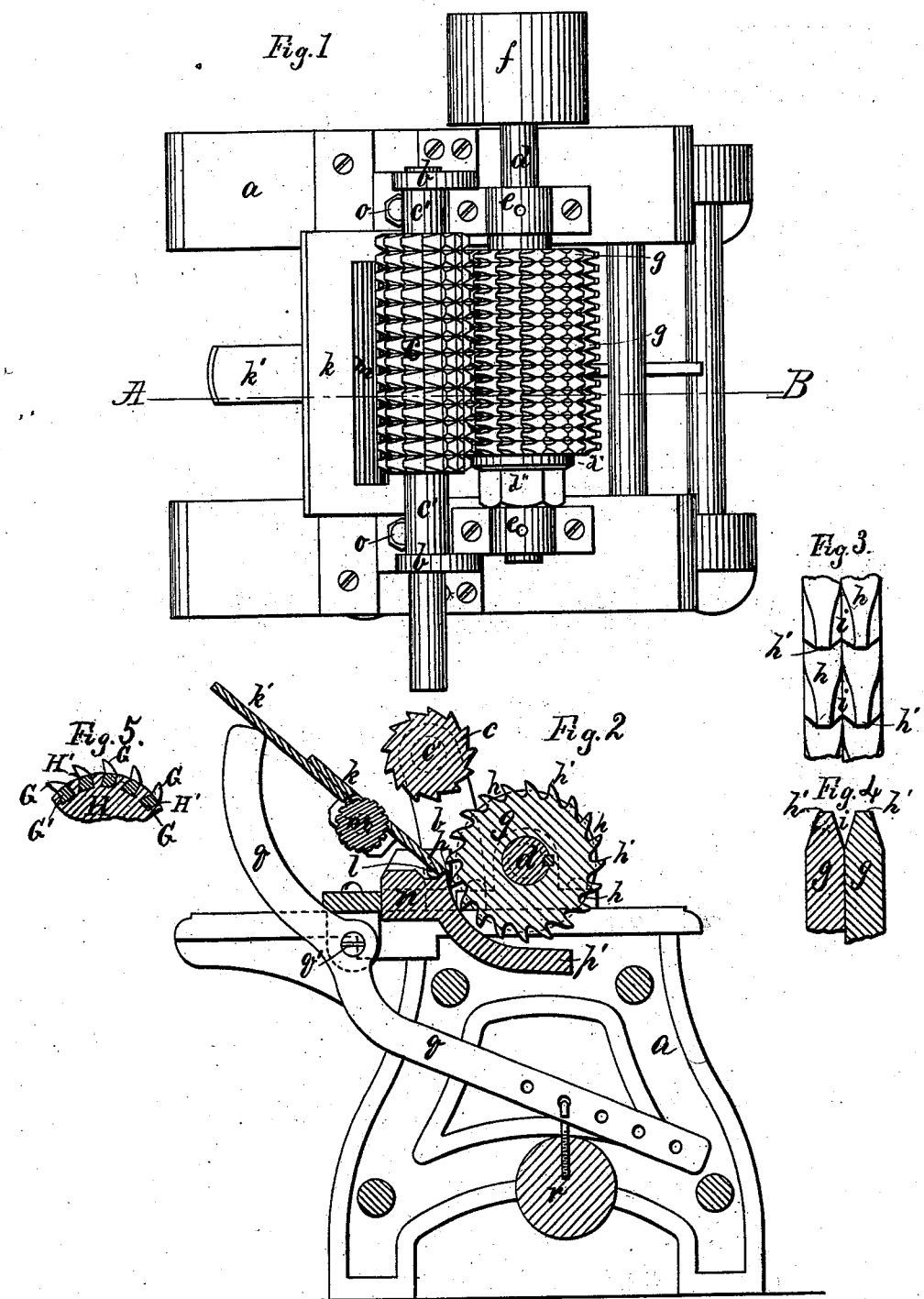
Witnesses:
Henry Chadbourn.
Carl Moller.
Inventor:
William Chicken
by Alba Andrew
his atty.

UNITED STATES PATENT OFFICE.

WILLIAM CHICKEN, OF CHELSEA, ASSIGNOR OF ONE-HALF HIS RIGHT TO THEOPHILUS S. SMITH, OF SOMERVILLE, MASSACHUSETTS.

IMPROVEMENT IN BARK-REDUCING MACHINES.

Specification forming part of Letters Patent No. 210,095, dated November 19, 1878; application filed July 15, 1878.

*To all whom it may concern:*

Be it known that I, WILLIAM CHICKEN, of Chelsea, in the county of Suffolk and State of Massachusetts, have invented certain new and useful Improvements in Bark-Cutting Machines; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in bark-cutting machines for the purpose of properly feeding bark to the machine and cutting it up in small particles without any liability of its being clogged up.

My invention consists, first, in providing the feeding-apron of a bark-cutting machine with a novel combination of adjustable yielding supporting devices, whereby the apron is held at a proper incline for supplying the bark to the grinding devices, and is allowed to yield if at any time too much bark should pass between the apron and a feed-roller arranged thereabove, as will be hereinafter particularly described; second, in a grinding-cylinder for bark-mills having its teeth arranged in longitudinal rows, with broad forwardly-inclined front faces, terminating at their tops in straight cutting-edges, and having broad forwardly-inclined rear surfaces, the teeth of each row being separated by spaces which are V-shaped or triangular in a section on a line from the centers of the bases to the forward top edges of the said teeth, whereby the forward edges of each row of teeth form a continuous disintegrating-edge, and the cylinder is prevented from clogging.

My invention may be modified as follows: The cutting-teeth, instead of being made on series of disks, may be made in longitudinal rows upon dovetailed bars inserted in longitudinal dovetailed grooves on the surface of the cutting-cylinder.

On the accompanying drawings, Figure 1 represents a plan view of my improved bark-cutting machine, and Fig. 2 represents a cross-section on the line A B, shown in Fig. 1. Fig. 3 shows a plan of the cutting-teeth, and Fig. 4 represents a sectional view of said cutting-teeth. Fig. 5 shows a sectional view of the modification of my cutting-cylinder, as above described.

Similar letters refer to similar parts wherever they occur on the different parts of the drawings.

$a\ a$ is the frame of the machine, made in the usual way, to which are attached the stationary bearings $b\ b$ for the shaft $c'$ of the feed-roller $c$, as usual. $d$ is the cutting-cylinder shaft, located in stationary bearings $e\ e$, and provided with a driving-pulley, $f$, in the ordinary way. $g\ g$ are the cutting-disks, secured side by side on the shaft $d$ by means of the collar $d'$ and screw-threaded nut $d''$, as usual. $h\ h$ are the cutting-teeth on the circumference of the disks $g\ g$, which teeth are made of a V shape, with a flat top, as shown in Fig. 4. $h'\ h'$ are the upper cutting-edges of the receding and hooked teeth $h\ h$, as shown in Figs. 2, 3, and 4.

The space $i$ between two teeth on two adjoining cutting-disks is of a V shape, as shown in Fig. 4. $k$ is the inclined apron, movable on fulcra $l\ l$ in close proximity to the teeth of the cutting-disks. $m$ is the corrugated roller, located in bearings on the apron $k$, as shown in Figs. 1 and 2. $n$ is the adjustable bar or frame, to which the apron $k$ is hinged, which frame is adjustable to and from the cutting-cylinder by means of the set-screws $o\ o$. $p$ is the cutter-bar or upper edge of the frame $n$, and $p'$ is the guard projecting below the cutting-disks $g\ g$, as and for the purpose set forth. $q$ is the apron-lever, movable on the fulcrum $q'$, and provided in its lower end with an adjustable weight, $r$, as shown in Fig. 2. The upper end of the lever $q$ rests against the under side of the extension $k'$ of the apron $k$.

In Fig. 5 the cutting-teeth G are shown as being made in one piece, with a dovetailed bar, $G'$, inserted in dovetailed grooves $H'$ in the circumference of the cylinder H, as a substitute for and modification of the solid disks shown in Figs. 2, 3, and 4.

What I wish to secure by Letters Patent and claim is—

1. The combination, with the cutting cylinder and bar $p$, of the hinged feed-apron $k$ and the lever $q$, provided at its lower end with an adjustable weight, substantially as and for the purpose set forth.

2. A grinding-cylinder for bark-mills having its teeth arranged in longitudinal rows, with broad forwardly-inclined front faces, terminating at their tops in straight cutting-edges, and having broad forwardly-inclined rear surfaces, the teeth of each row being separated by spaces which are V-shaped or triangular in a section on a line from the centers of the bases to the forward top edges of the said teeth, substantially as described, and for the purpose set forth.

In testimony that I claim the foregoing as my own invention I have affixed my signature in presence of two witnesses.

WILLIAM CHICKEN.

Witnesses:
 ALBAN ANDRÉN,
 T. G. SMITH.